Dec. 19, 1944. D. T. STREET 2,365,361
OPTICAL APPARATUS
Filed April 7, 1943 2 Sheets-Sheet 2

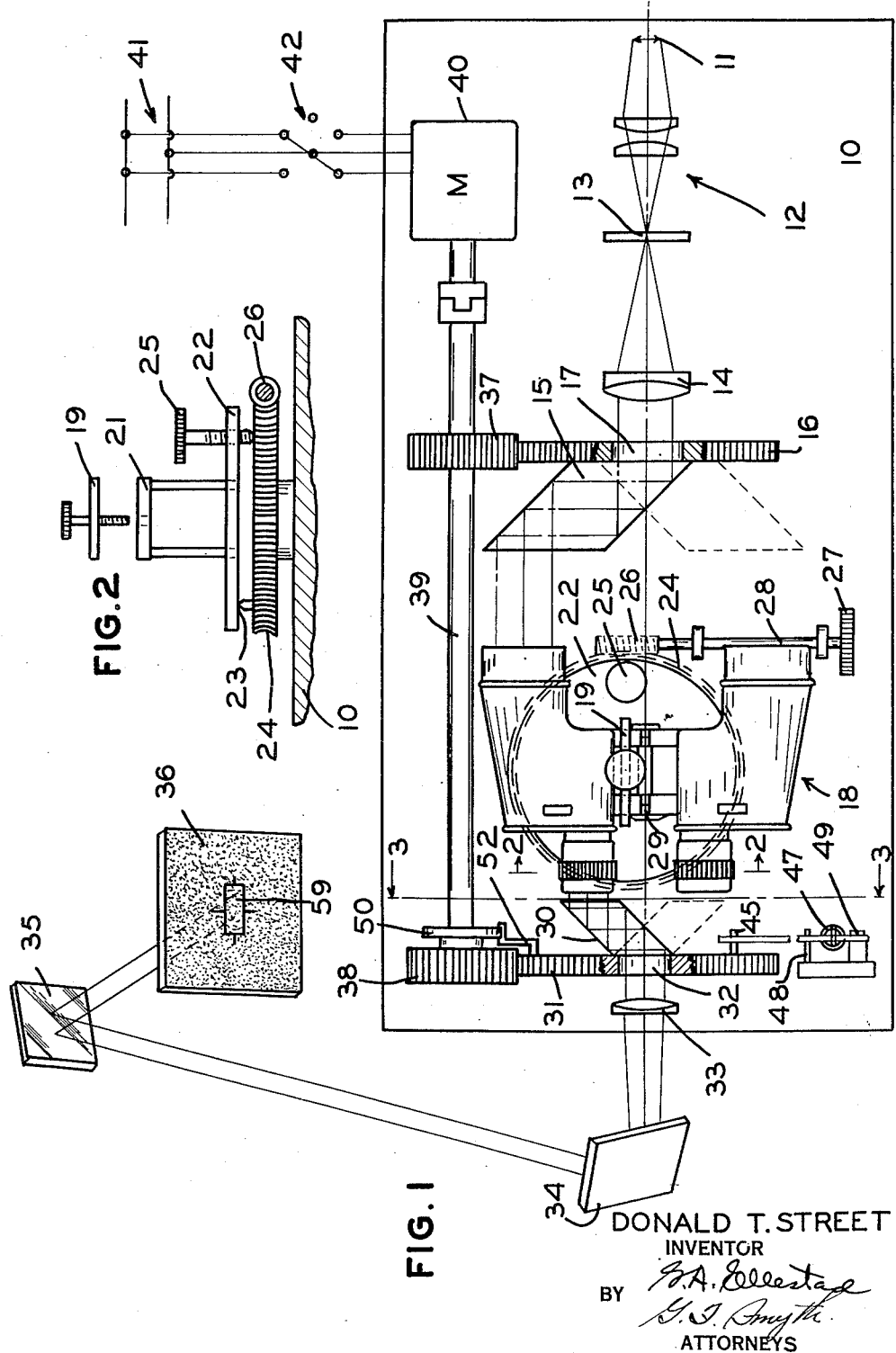

DONALD T. STREET
INVENTOR

BY
ATTORNEYS

Patented Dec. 19, 1944

2,365,361

UNITED STATES PATENT OFFICE 2,365,361

OPTICAL APPARATUS

Donald T. Street, Rochester, N. Y., assignor to Bausch & Lomb Optical Company, Rochester, N. Y., a corporation of New York Application April 7, 1943, Serial No. 482,140

13 Claims. (Cl. 88—33)

This invention relates to testing apparatus and more particularly to apparatus for testing binocular instruments such as prismatic field glasses.

In certain binocular instruments, such as prismatic field glasses, it is extremely important that the optical axis of each body member be maintained parallel. In field glasses where the body members are joined by a hinged connection for interpupillary distance adjustment, the optical axis of each member should be parallel to the axis of the connection in all adjusted positions.

The testing operations to ascertain if the optical ax's of each body member is parallel to that of the other member and the mechanical axis of rotation of the hinged connection between the body members are difficult and tedious. The operations heretofore used to test instruments such as binocular field glasses have generally been made by a plurality of devices each comprising two pairs of telescopes, one pair being mounted before the objectives and a pair in front of the eye lenses of the instrument, together with light sources for projecting pencils of light through the telescopes and the binocular instrument mounted between same.

In the approved practice, each body member was separately checked for alignment and thereafter the alignment of the optical axis of each body member relative to the optical axis of the other and the axis of the hinge connection was tested. It was necessary to hold the four telescopes of each device exactly parallel and this has been difficult and costly to do. Considerable time was consumed in mounting the field glass in each device for the test to be made with each device and the labor costs for the test were relatively high. Labor costs were further increased by the fact that the results of the testing operations depended to a large extent on the skill of the operator and hence it was necessary to employ skilled high paid operators to conduct the tests.

The apparatus of the present invention obviates the difficulties of the prior instrument, in that, the parallel telescopes have been dispensed with and a single telescope or collimator, together with a rotatably mounted rhomboid prism, is used to direct parallel pencils of light to the objective lenses of the binocular undergoing examination. In the illustrated embodiment of the apparatus of the present invention, a light source illuminates the reticle of the collimator and the rotatably mounted rhomboid prism alternately directs the image to the objectives of the binocular undergoing examination.

As the light directed to the objectives of the two body members of the instrument is focused at infinity, that is, the rays are parallel, the eyepieces can be adjusted until the emerging rays are still focused at infinity. Thus the apparatus of the present invention can be used for the "sighting" operation which heretofore has been done on a machine separate from the testing devices.

In the embodiment of the invention now preferred, the light pencils alternately emerging from the eye lenses of the binocular are picked up by a second rotatably mounted rhomboid prism and the pencils will be directed by the second rhomboid prism along an axis coincident with an extension of the optical axis of the collimator. The pencils of light are thereafter focused by a projection lens on a suitable receptor such as a ground glass screen which is located at the focal point of the projection lens.

The position of the telescopic images alternately thrown on the screen can be compared with suitable index means indicative of the desired position. The position of the telescopic images projected on the screen relative to the index means, or relative to each other, will indicate to the operator whether or not the optical axis of the body members are parallel to each other. If the body members are pivotally connected, one member may be fixed and the free member swung about the hinge connection and the position of the images formed by the fixed body member and the free body member in the alternate positions thereof will indicate the relative positions of the optical axis of the body members and the axis of the connection joining the two members. Thus no particular skill is required of the operator and relatively unskilled operators can be used to complete the test.

Each of the rhomboid prisms are mounted on a gear wheel driven through a pinion carried by a suitably driven shaft. The rhomboid prisms should be of such a size relative to the binocular undergoing test as to displace the light beam from the optical axis of the collimator to the approximate center of the objective lens and from the approximate center of the eye lenses to a path substantially coincident with an extension of the optical axis of the collimator.

To complete a test by the apparatus of the present invention, one body member is fixed relative to the apparatus and the optical axis of the body member free to move about the axis of the hinged connection is checked for misalignment. After the optical axis of the free body member is properly aligned with the axle of the hinged connection, the rhomboid prisms are then moved to a position in which they are properly aligned with the eye lens and objective of the fixed body member.

If the rhomboid prisms are arcuately moved the same distance, the same will not be properly positioned relative to the eye lens and objective, and a feature of the present invention is the means used to move the rhomboid prisms so that the same will always be properly aligned with the objective and the eye lens of the unit being examined. This means in the form now preferred comprises means for discontinuing of the driving connection between the gear carrying the eye lens prism and its pinion after the prism has been moved into an aligned position relative to the eye lens but which yet permits the gear carrying the objective prism to be driven until the prism is in alignment with the desired objective.

Other objects and advantages will appear from the following description taken in connection with the accompanying drawings in which:

Fig. 1 is a schematic view of the instrument of the present invention.

Fig. 2 is a fragmentary section taken along line 2—2 of Fig. 1.

Figure 3:
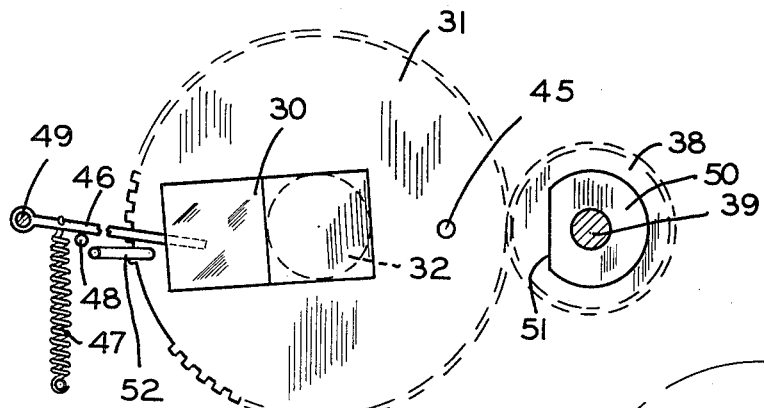
Fig. 3 is a fragmentary section taken along line 3—3 of Fig. 1.

The apparatus of the present invention, referring now to Fig. 1, comprises a base member 10 on which is supported a suitable light source 11 such as a small incandescent lamp and a telescope collimator 12 having a reticle 13 disposed in the focal plane of the objective lens 14 of the telescope. Light pencils from the light source 11 are projected at infinity by the objective lens 14 to one face of a rhomboid prism 15 carried by a gear 16 having an opening 17 formed in the center thereof and rotatably mounted on the base member 10 by any conventional means desired.

The light incident on the entrance face of the rhomboid prism 15 after reflectance by the two reflecting surfaces thereof is directed from the rhomboid in a path parallel to the path of the incident rays but laterally displaced therefrom. The emerging rays are directed to substantially the center of one of the objective lenses of the binocular 18 undergoing tests, depending on the position of the prism relative to the binocular.

The one body member of the binocular 18 undergoing test is rigidly held by a clamp 19 to a small table 21 carried by a supporting plate 22 pivotally mounted at 23 to a circular plate 24 which is rotatably mounted on the base member 10. The position of the table 21 is adjustable relative to the supporting plate 22 by means of an adjusting screw 25. The edge of the plate 24 is formed with a suitable thread engaged by a worm 26 and the plate may be rotatably moved about a fixed axis on the base 10 by manipulation of a small operating knob 27 carried by the worm shaft 28.

It will be seen that the axle 29 of the hinge connection between the two body members of the binocular 18 may, through the supporting members just described, be adjusted relative to the base 10.

The parallel pencils of light alternately directed by the rhomboid prism 15 to the objective lenses of the binocular 18 are passed through the same and exit through the eyepieces or ocular systems of the body units of the instrument. These rays are incident on an entrance face of a rhomboid prism 30 suitably supported on a gear 31 rotatably mounted on the base 10 and having as opening 32 formed at the center thereof to permit the light reflected by the reflecting faces of the rhomboid prism 30 to pass therethrough to a projection lens 33. The projection lens 33 projects the image of the illuminated reticle 13 to the reflecting surface of the first surface reflector 34 which is so disposed relative to a second relative to a second reflector 35 that the light rays are directed to the reflecting surface thereof and in turn reflected onto a screen 36.

It will now be seen that light from the light source 11 will illuminate the reticle 13 and the image thereof will be projected onto the screen 36, which is preferably located at the focal point of the lens 33.

The apparatus of the present invention can be used for "sighting" each body unit of the instrument and to do this it is only necessary for the operator to focus the eyepiece of each unit until the image of the reticle is sharply defined on the screen 36. As in previous practice, the operator may now mark the ocular tube and its mounting tube to indicate the position of the ocular tube relative to the mounting tube when the eyepiece is focused at infinity. If the eyepiece is to be of the fixed focus type, the screen can be moved relative to the projection lens so that the eyepiece can be "sighted" for its position at the desired focus.

Although any means desired may be used for driving the gears 16 and 31 carrying the rhomboids 15 and 30, in the now preferred embodiment of the apparatus of the present invention, the gears 16 and 31 are driven by pinions 37 and 38, respectively, carried by a shaft 39 driven by suitable power source such as the small electric motor 40. The motor 40 is reversible and is connected to a source of current such as the line 41 by suitable lead in conductors and the reversing switch 42. Thus by proper actuation of the switch 42, the motor 40 will drive the gears 16 and 31 in reverse directions through the shaft 39 and pinions 37 and 38 mounted thereon.

Figure 5:
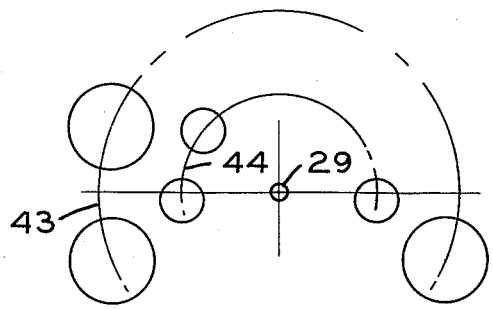
Fig. 5 is a schematic view showing the relative positions of the eye lenses and objective lenses in the various testing positions of the body members.

It will be seen, referring now to Fig. 5 in which the relative positions of the eye lens and objective of the free body member in alternate positions of the same are schematically shown at the left thereof, that the rhomboids can be moved into proper aligned positions relative to the eye lens and objective of the free body member in the alternate testing positions thereof. In prismatic binoculars as the arcuate distance between objective centers is greater than the arcuate distance between the centers of the eye lenses, the rhomboids cannot be arcuately moved from their positions relative to the free body member in either of the alternate positions thereof and into proper alignment with the eye lens and objective of the fixed body member, the relative positions of which are schematically shown at the right in Fig. 5, by equally driving the mounting gears.

To bring the rhomboid 30 into proper alignment with the eyepiece of the fixed body member, some means must be provided for preventing the gear 31 from rotating after the rhomboid 30 has been moved into its proper aligned position relative to the eyepiece. Although any means desired may be used to prevent rotation of the gear 31, such as a suitable clutch mechanism, in the embodiment of the device of the present invention now preferred, the gear 31 is mutilated by the removal of a plurality of teeth. The teeth of the pinion run into the mutilated portion of the gear after the rhomboid has been moved into its proper position relative to the eyepiece of the fixed unit and the gear 31 will no longer be driven.

Figure 4:
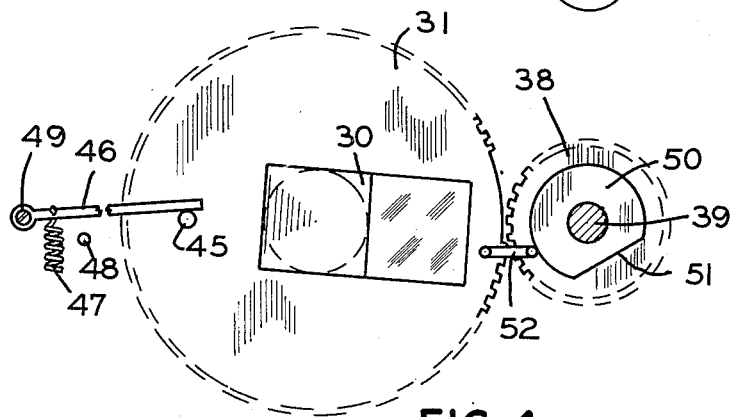
Fig. 4 is a view similar to Fig. 3 but showing the gear and pinion in a different position.

To prevent the gear from accidentally rotating, after the same is no longer being driven, a distance sufficient to run the teeth of the pinion out of the mutilated portion of the gear 31, the latter carries a pin 45 projecting from one face thereof and which is moved into engagement with one end of a lever 46, pivotally mounted at the opposite end to a support carried by the base 10, just prior to movement of the mutilated portion of the gear to the position shown in Fig. 4. A spring 47, having one end connected to the lever 46, has the opposite end fixed to the base 10 and normally holds the lever 46 against a stop pin 48.

It will be seen, referring now to Fig. 4, that when the pinion 38 has driven the gear 31 to the position illustrated in the figure referred to, the mutilated portion of the gear 31 prevents the pinion 38 from driving the same although the pinion 38 will continue to rotate with the shaft 39. In this position of the gear 31, the pin 45 is engaging the lever 46 and has moved the same about its pivot 49 against the action of the spring 47. The lever 46 will thus urge the gear 31 in a counterclockwise direction as appears in Fig. 4 and prevents accidental rotation of the gear 31 in a clockwise rotation which might bring the teeth of the gear 31 into engagement with the teeth of the pinion 38.

Thus the gear 31 carrying the rhomboid 30 can be stopped when the latter has been moved into the proper position relative to the eyepiece while the motor continues to drive the gear 16 carrying the rhomboid 15 to a position in which the rhomboid 15 is properly aligned with the objective of the fixed unit.

To prevent the gear 31 from meshing with the pinion 38 immediately upon reversal of the motor, the shaft 39 carries a disc 50 having a portion of its peripheral edge cut away as indicated at 51. The one surface of the gear 31 carries a pin 52 adjacent the edge thereof which is laterally offset to extend beyond the teeth of the gear 31. The disc is of such a diameter that it forms a stop in the path of the laterally offset portion of the pin and prevents movement of the gear 31, as the direction of rotation of the pinion is reversed, until the cutaway portion of the disc is brought into a position in which the lateral extending portion of the pin is free to move in its arcuate path. As the laterally extending portion of the pin 52 is freed, the gear 31 is urged through the pin 45 and spring pressed lever 46 in a counterclockwise direction to bring a tooth of the gear 31 into mesh with the teeth of the pinion 38, after which the pinion 38 drives the gear 31 in the usual manner.

It should be apparent now that the prisms can be moved into any desired position, relative to the body members to be tested, by proper actuation of the switch 42.

In the use of the apparatus, after the binocular to be tested has been clamped in position with the axle of the hinge connection substantially coincident with the optical axis of the collimator, the rhomboids are moved into proper position relative to the fixed unit and the eyepiece thereof is adjusted until the image of the reticle 13 is sharply focused on the screen 36. This, as previously mentioned, is the infinity position of the eyepiece and indicates that the pencils emerging from the eyepiece are parallel. The rhomboids are now moved to their testing position relative to the free body unit and this unit is "sighted" as just explained.

As the clamp 19 holds but one-half of the hinge mechanism joining the two body units of the binocular, the free body member may be rotatably moved about the axle 29 to bodily displace the optical axis thereof in alternate positions relative to the axle of the hinge connection.

The free body member is now bodily displaced from the first test position and the motor 40 energized through the switch 42 to cause the former to move the rhomboids to a position in which they are again aligned with the objective and eyepiece of the free body member. If the image of the reticle 13 on the screen 36 coincides with the position of the image in the first test position of this body member, the optical axis of the body member is parallel with the axle 29 of the hinge connection. If the image in the second test position does not coincide with the position of the image in the first test position, the objective mount which includes an eccentric ring such as described in U. S. Patent No. 959,739 can be rotated to laterally shift the position of the optical axis of the objective. The body is then swung back to its original test position, the rhomboids returned, and the position of the image of the reticle 13 on the screen 36 is again noted. If the position of the image is again displaced from its original position, it will be evident that the axle 29 is not parallel to the light rays entering the objective and the axle can be shifted by adjusting the binocular relative to the base 10. After the adjustment of the entire binocular, the body member undergoing test is moved again to the second test position, the rhomboids aligned with the same, and the location of the image of the reticle 13 again noted on the screen 36. If it is found that the position of the image on the screen 36 does not yet coincide with the desired position, the objective mount as well as the adjustable supporting means can be again adjusted, the body member and rhomboids again moved to the other test position, and the position of the image again compared. This procedure is repeated until the image occupies the approximate center of an index pattern 59 formed on the screen 36.

It will be appreciated that it is not necessary to so adjust the supporting means and objectives to cause the telescopic image to occupy central positions relative to the index pattern, for the optical axis of each body member will be in proper alignment if the telescopic images occupy the same position on the screen in all testing positions.

When the image of the reticle 13 occupies the approximate center of the index mark 59, the motor 40 is energized to move the prisms 15 and 30 to a position in which they are in alignment with the objective and eyepiece of the fixed body member of the binocular 18. When the prisms have been moved into the proper position, the location of the image of the reticle 13 on the screen 36 is noted. If the image does not fall within the index pattern 59, the objective mount is adjusted in an attempt to bring the image into a position coincident with or approximating the position of the image formed by the other body of the binocular. If this cannot be done, the instrument is defective and must be returned for correction.

It will now be seen that all testing operations necessary to complete a binocular field glass can be performed on the apparatus of the present invention and that the plurality of instruments heretofore used can be dispensed with. The apparatus of the present invention not only reduces the cost of equipment necessary to complete the assembly of a binocular field glass, but reduces the labor cost as well for an operator can complete the adjustment in a shorter period of time than heretofore possible with prior equipment.

The present apparatus is not difficult to maintain in good operating condition, for the same is not sensitive to the location or position of the rhomboids, reticle position, projection lens position, screen position, and will perform satisfactorily as long as the reflecting faces of the rhomboids are parallel. This condition is relatively easy to maintain because the surfaces are on the same piece of glass which has a very stable overall shape and the faces cannot shift out of the parallel relationship once the faces are formed on the glass.

While I have shown and described a preferred embodiment of my invention, it is to be understood that the invention is not to be limited to the details of construction shown but is susceptible of changes in form and detail within the scope of the appended claims.

I claim:

1. An apparatus for aligning the optical systems of pivotally connected body members of a binocular comprising means for fixing one body member against movement with the other body member free to move about the pivotal connection; a collimator; means for illuminating the reticle of said collimator; and means for selectively directing the illuminated image of the reticle of said collimator to the objective of the free body member in alternate positions thereof and to the objective of the fixed body member.

2. An apparatus for aligning the optical systems of pivotally connected body members of a binocular comprising means for fixing one body member against movement with the other body member free to move about the pivotal connection; a collimator; means for illuminating the reticle of said collimator; means for selectively directing the illuminated image of the reticle of said collimator to the objective of the free body member in alternate positions thereof and to the objective of the fixed body member; and means for projecting the telescopic images formed by the body members as the illuminated images of the reticle are selectively directed to the objectives thereof.

3. An apparatus for aligning the optical systems of a binocular comprising means for alternately directing a single image focused at infinity to the objectives of said binocular, said means comprising reflecting means mounted for arcuate movement between the objectives of said binocular; a screen; and means for projecting the telescopic images formed by the optical elements of each body member of said binocular onto said screen, said means comprising reflecting means mounted for arcuate movement between the eyepieces of said binocular.

4. An apparatus for aligning the optical systems of a binocular comprising a light source; a fiducial means; means for focusing an illuminated image of said fiducial means at infinity; reflecting means mounted for arcuate movement between the objectives of said binocular for alternately directing the said image of said fiducial means to the objectives of said binocular; a screen; and means for projecting the telescopic images of the fiducial means formed by the optical elements of each body member of said binocular onto said screen, said means comprising reflecting means mounted for arcuate movement between the eyepieces of said binocular.

5. An apparatus for aligning the optical systems of jointed binocular field glasses comprising a collimator having a reticle; means for mounting the field glass on said apparatus with the axis of the hinge connection thereof substantially coincident with the optical axis of said collimator; means for illuminating said reticle; parallel reflecting means; means for mounting said reflecting means for arcuate movement about the optical axis of said collimator whereby the image of the illuminated reticle of said collimator may be selectively directed by said parallel reflecting means to one or the other of the objectives of said binocular; and means for comparing the relative position of the telescopic images of said reticle.

6. An apparatus for aligning the optical systems of jointed binocular field glasses comprising a collimator having a reticle; means for illuminating said reticle; a rhomboid prism; means for mounting said prism with an entrance face substantially normal to the optical axis of the collimator; and means for arcuately moving said mounting means whereby said prism is arcuately moved about an axis substantially coincident with the optical axis of said collimator, said prism adapted in predetermined positions thereof to selectively direct an illuminated image of said reticle to one or the other of the objectives of said binocular.

7. An apparatus for aligning the optical systems of jointed binocular field glasses comprising a collimator having a reticle; means for illuminating said reticle; a rhomboid prism; means for mounting said prism with an entrance face thereof substantially normal to the optical axis of the collimator; means for arcuately moving said mounting means whereby said prism is arcuately moved about an axis substantially coincident with the optical axis of said collimator, said prism adapted in predetermined positions thereof to selectively direct an illuminated image of said reticle to one or the other of the objectives of said binocular; a second rhomboid prism; means for mounting said second rhomboid prism with an entrance face substantially normal to the optical axis of said collimator; means for arcuately moving said last-named mounting means whereby said second rhomboid prism is arcuately moved about an axis substantially coincident with the optical axis of said collimator to selectively direct light rays forming the telescopic images of said reticle in a path substantially coincident with the optical axis of said collimator.

8. An apparatus for aligning the optical systems of a jointed binocular field glass comprising a collimator having a reticle; means for illuminating said reticle; means for clamping one telescope body of said binocular against movement with the other member thereof free to swing about the axis of the hinge connection between the two telescope bodies of the field glass; means for selectively directing the image of said illuminated reticle to the objective of the free body of the field glass in alternate positions thereof; and means for comparing the telescopic images formed of said reticle in the alternate positions of said free telescope body.

9. An apparatus for aligning the optical systems of jointed binocular field glasses comprising a base; supporting means rotatably mounted on said base; mounting means pivotally mounted on said supporting means; means for clamping one body member of said field glass to said mounting means; a collimator having a reticle; means for illuminating the reticle of said collimator; and means for selectively directing the image of said illuminated reticle to the objective of the body member free to move relative to the base in alternate positions of said member and to the objective of the fixed member.

10. An apparatus for aligning the optical systems of jointed binoculars comprising a collimator; a support; means for fixing one body member of said binocular against movement relative to said support; means for adjustably mounting said support whereby the axis of rotation of the hinge connection between the body units of said binocular may be moved into substantially coincidence with the optical axis of said collimator; means for illuminating the reticle of said collimator; means for alternately directing the illuminated image of said reticle to the objective of the free body member in alternate positions of the free member; a screen; means for projecting the telescopic images of said reticle formed by the free body member in alternate positions thereof onto said screen; said directing means being operative to direct said image to the objective of the fixed body unit and said projecting means projecting the telescopic image of the reticle formed by said fixed body member onto said screen whereby the relative position of the images on the said screen can be compared.

11. An apparatus for aligning the optical systems of jointed binoculars comprising a collimator; means for clamping one body member of a binocular with the other free to swing for bodily displacement of its longitudinal optical axis, the axis of the hinged connection between the body members of the binocular being held in a position substantially coincident with the optical axis of said collimator; a rhomboid prism; means for mounting said prism intermediate said binocular and said collimator with an entrance face thereof substantially normal to the optical axis of said collimator; a second rhomboid prism; means for mounting said second rhomboid prism adjacent the opposite end of said binocular with an entrance face substantially normal to the optical axis of the eyepiece of said binocular; common means for arcuately moving said rhomboid prisms about an axis substantially coincident with the optical axis of said collimator, said firstnamed prism adapted to laterally displace and selectively direct the image of said illuminated reticle to one of the objectives of said binocular; projection means, the other prism directing the telescopic images of said reticle formed by one or the other of the body members to said projecting means; and a screen for receiving the projected images.

12. An apparatus for aligning the optical systems of jointed binocular field glasses comprising means for clamping one body member of the binocular with the other free to swing for bodily displacement of the longitudinal optical axis thereof; a collimator mounted with the optical axis thereof substantially coincident with the axis of the hinged construction of the binocular; means for illuminating the reticle of said collimator; a pair of rhomboid prisms; means for rotatably mounting a prism at the opposite ends of said binocular for rotation about a common axis substantially coincident with the optical axis of said collimator; means for driving said mounting means whereby one of said prisms is adapted to be moved into optical alignment with the objective of either body member of said binocular, the other prism being movable in an arcuate path into optical alignment with the eyepieces of either body of said binocular, said driving means including means for preventing rotation of the last-named prism after it has been moved from a position in which it was in optical alignment with the eyepiece of one body to a position in which it is in optical alignment with the eyepiece of the other body while the other prism is being moved a greater arcuate distance and into alignment with the objectives of the other body.

13. An apparatus for aligning the optical systems of jointed binocular field glasses comprising a collimator; means for mounting a field glass with the axis of the hinge connection of the glass substantially coincident with the optical axis of the collimator; means for illuminating the reticle of said collimator; a rhomboid prism disposed at opposite ends of said glass; means for mounting each prism for movement about a common axis substantially coincident with the optical axis of said collimator, the one prism being of such a size and shape relative to the glass that it directs the light rays forming the collimator image of the illuminated reticle to one or the other of the objectives of the glass, the other prism directing the telescopic image of the reticle formed by either body member of the glass in a path coincident with the optical axis of said collimator to said projection lens; common means for driving said mounting means to arcuately move said prism; and means for preventing rotation of the prism mounted adjacent to the eyepieces of said glass as the same is moved from a position in optical alignment with one eyepiece to a position in which it is in optical alignment with the other eyepiece as the other prism is rotated a greater arcuate distance to bring it into optical alignment with the other objective.

DONALD T. STREET.